United States Patent [19]
Auborn

[11] 3,891,457
[45] June 24, 1975

[54] ELECTROCHEMICAL CELL

[75] Inventor: James J. Auborn, Groton, Mass.

[73] Assignee: GTE Laboratories Incorporated, Waltham, Mass.

[22] Filed: Nov. 29, 1973

[21] Appl. No.: 420,125

[52] U.S. Cl. .......... 136/6 LN; 136/100 R; 136/154; 136/155; 136/137
[51] Int. Cl. ......................................... H01m 43/06
[58] Field of Search.... 136/6 LN, 6 R, 83 R, 100 R, 136/154, 155, 121, 20, 137, 120 R

[56] References Cited
UNITED STATES PATENTS

| | | | |
|---|---|---|---|
| 3,567,515 | 3/1971 | Maricle et al. | 136/6 LN |
| 3,578,500 | 5/1971 | Maricle et al. | 136/6 LN |

*Primary Examiner*—Anthony Skapars
*Attorney, Agent, or Firm*—Irving M. Kriegsman

[57] ABSTRACT

An electrochemical cell having an oxidizable active anode material; an inert cathode current collector; and an electrolyte in the form of a paste between and in contact with the anode and the inert cathode current collector. The electrolyte comprises a suspension of small carbon particles in a covalent inorganic oxyhalide or thiohalide solvent selected from the group consisting of phosphorus oxychloride, monofluorophosphoryl dichloride, monobromophosphoryl difluoride, monofluorophosphoryl dibromide, thiophosphoryl chloride, thionyl chloride, thionyl bromide, sulfuryl chloride, monofluorothiophosphoryl dichloride, monofluorothiophosphoryl dibromide, monobromothiophosphoryl difluoride, and mixtures thereof, and a solute dissolved in the inorganic solvent material. The carbon particles suspended in the electrolyte paste catalyze the electrochemical decomposition of the solvent whereby the inorganic solvent in conjunction with the oxidizable anode serves as a source of electrical energy during operation of the cell.

26 Claims, No Drawings

ELECTROCHEMICAL CELL

CROSS-REFERENCE TO RELATED APPLICATIONS

This invention is related to the electrochemical cells described in application Ser. No. 305,813, filed Nov. 13, 1972.

BACKGROUND OF THE INVENTION

This invention relates to electrochemical cells. More particularly, it relates to electrochemical cells having an oxidizable active anode material, an inert cathode current collector, and a paste electrolyte therebetween having an inorganic solvent material, a solute dissolved in the solvent material, and small carbon particles suspended in the solvent material. The carbon particles catalyze the electrochemical decomposition of the cell during operation thereof.

Modern technology has placed increased emphasis on producing an electrochemical power source having improved reliability, light weight, small size, high power and long life. Power sources meeting these requirements find ready civilian and military applications in portable communications systems, entertainment products, emergency lights and portable electronic devices such as hearing aids and wrist watches. An expensive, lightweight, high power, reliable power source would be of great value for use, for example, with portable radios or television sets.

Various high-voltage, high energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature inorganic molten salt electrolytes and organic solvent-based electrolytes. A cell which utilizes a molten salt electrolyte provides a chemically stable system in which strong oxidants, such as chlorine, can be used as cathodes. For example, a molten salt cell utilizing a lithium anode and chlorine cathode provides exceptionally high energy and power density making development of a practical cell with these materials of particular interest. The molten salt-lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450°C to 650°C, necessitates heating systems and insulation that increases cell cost, weight and complexity. To collect and store the chlorine evolved in rechargeable cells at these high temperatures, auxiliary systems are needed. In addition, there are few materials that can withstand, for extended periods of time, the attack of molten lithium, chlorine and molten lithium chloride at these temperatures; therefore the operating lifetime of these cells is relatively short, typically 20 to 30 minutes. The measured and theoretical open circuit voltage of these high temperature cells is about 3.5 volts, although approximately 4 volts are theoretically obtainable at 25°C (at higher temperatures the potential is lower because of the lower energy change in the overall cell reaction).

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as a cathode with these solvents since the solvents are oxidized by chlorine. Therefore, cells of this type will not provide an energy density as high as a lithium/chlorine cell.

In application Ser. No. 305,813, filed Nov. 13, 1972, there are described electrochemical cells having an oxidizable active anode material, a cathode having carbon as the active cathode component, and an electrolyte comprising an inorganic solvent material and a solute, selected from a wide range of materials, dissolved in the solvent material.

The present invention is related to the invention described in the aforementioned application in that the same anodic and electrolyte materials can be utilized in the present invention; however, this invention relates to the use of such materials with an electrolyte having small carbon particles suspended therein in sufficient quantity to form a paste. As set forth in greater detail below, various advantages can be attained when such a paste electrolyte is utilized.

SUMMARY OF THE INVENTION

This invention provides an electrochemical cell having an oxidizable active anode material, an inert cathode current collector, and an electrolyte between and in contact with the anode and cathode current collector. The electrolyte comprises an inorganic, oxyhalide or thiohalide solvent material and a solute selected from a wide range of materials dissolved in the inorganic solvent material. The electrolyte further includes a sufficient quantity of small carbon particles to form a paste. The carbon can be in any of its conventional forms, for example, graphite, carbon black, acetylene black, etc. Graphite and carbon black are, however, presently preferred. The carbon particles catalyze the electrochemical decomposition of the inorganic solvent material whereby the inorganic solvent in conjunction with the oxidizable anode material serves as a source of electrical energy during excitation of the cell. This enables the otherwise "dead" weight of the electrolyte solvent to be utilized as a source of electrical energy.

The electrolyte paste comprises a solvent material selected from those set forth above, a solute dissolved in the solvent to make the paste electrically conducting, and a sufficient quantity of small carbon particles to give the electrolyte the desired paste-like consistency; generally, this will be up to about 20%, by weight, of the total electrolyte weight.

It is believed that the inorganic solvent is electrochemically reduced on the surface of the carbon particles to yield a halogen ion which reacts with a metal ion from the anode to form a stable metal halide, such as, for example, lithium chloride. The overall effect is to electrochemically reduce the solvent by removal of a portion of its halogen content in conjunction with the oxidation of the anode metal and thereby obtain electrical energy therefrom. This energy can be attained, however, in the absence of other cathode depolarizers or oxidant materials, such as sulfur dioxide, which are not needed in the cells of this invention since the inorganic solvent also serves as the oxidant material. In addition, it is believed that the inorganic solvent passivates the anode material, whereby the need to provide an additive or a further material to passivate the anode is obviated.

The current collector comprises a solid, inert, non-consumable, electrically conducting material which serves to complete the external electrical circuit during operation of the cell. Applicable current collector materials are generally chemically inert metals or metal alloys, such as nickel or stainless steel. The current collector can also be made up of carbon or graphite as set forth in the aforementioned application Ser. No. 305,813. The current collector can be added as a separate component of the cell. For example, by immersing a current collector rod of an applicable material into the electrolyte paste, or the current collector can be the external housing or case of the cell. In either structure, appropriate connections are made to the current collector and the anode so as to establish the desired external electrical circuit.

The anode is an oxidizable material and is preferably lithium metal. Other oxidizable anode materials contemplated for use in the cells of this invention include the other alkali metals, such as sodium, potassium, etc., the alkaline earth metals, such as beryllium, magnesium, calcium, strontium, and barium; the Group IIIA metals, such as aluminum, gallium, indium and thallium; the Group IV A metals, such as tin and lead; the Group V A metals, such as antimony and bismuth; the transition metals, such as scandium, titanium, vanadium, chromium, maganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold and mercury; and rare earth metals, such as lanthanum, cerium, praseodymium, neodymium, samarium, europium, gadolinium, terbium, dysprosium, holmium, erbium, thulium, ytterbium, and lutetium, and combinations thereof, or alloys thereof with other metallic elements, such as lithium alloys with aluminum, magnesium, germanium or silicon, or the sodium alloys with lead, etc., provided the anode material selected provides a potential vs. the inert cathode current collector selected in a covalent inorganic solvent-based electrolytic solution (i.e., the anode is more electropositive than the inert cathode current collector utilized) and the anode can be oxidized thereby. The anode may be constructed of the oxidizable material in contact with a metal grid. The grid for a lithium anode, for example, may be made of nickel, nickel alloys (such as monel), stainless steel, silver, or platinum.

As used throughout this specification and claims, when an electrochemical cell is designated to have a particular anode or inert cathode current collector or to have a particular anode or inert current collector material, that anode or cathode current collector, or anode or cathode current collector material, shall mean the electrochemically active component of the anode structure, or the non-consumable, electrically conducting, inert metallic cathode current collector, as the case may be. Such an electrode may be in contact with, or form a part of, a suitable substrate which further defines the total anode or cathode current collector structure.

As indicated above, the electrolytic solution comprises a liquid covalent inorganic oxyhalide or thiohalide solvent and a solute dissolved therein. Applicable solvent materials include phosphorus oxychloride, monofluorophosphoryl dichloride, monobromophosphoryl difluoride, monofluorophosphoryl dibromide, thiophosphoryl chloride, thionyl chloride, thionyl bromide, sulfuryl chloride, monofluorothiophosphoryl dichloride, monofluorothiophosphoryl dibromide, monobromothiophosphoryl difluoride, and mixtures thereof.

It is preferred that the solvent be dried (or at least partially dried) prior to use. This is accomplished by boiling this solvent material with clean lithium shot - metal for 12 hours at room temperature under an argon atmosphere. The solvent is then distilled at atmospheric pressure and the material which boils between 105°C and 106°C collected. The solvent thus prepared has a specific conductance of less than $7 \times 10^{-7}$ Mhos/cm. Other solvents can be dried in an analogous manner (with solvent collection being at or about the boiling point of the particular material), or by techniques known in the art. Since these solvents are electrochemically reducible, but otherwise relatively non-reactive, and the reaction products of such reduction are relatively non-reactive, cells can be constructed with a wide range of anode and cathode materials, particularly anode materials which themselves are highly reactive, such as, for example, lithium.

The typical solute provides at least one anion of the general formula $X^-$, $MX_4^-$, , $M'X_6^-$, and $M''Cl_6^=$, where M is an element selected from the group consisting of aluminum and boron; M' is an element selected from the group consisting of phosphorus, arsenic and antimony; M'' is an element selected from the group consisting of tin, zirconium, and titanium; and X is a halogen. Examples of suitable solutes yielding anions $MX_4^-$ are: tetrachloroaluminates ($alCl_4^-$), tetrabromoaluminates ($AlBr_4^-$), tetrachloroborates ($BCl_4^-$), and tetfluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$), and hexachloroantimonates ($SbCl_6^-$). Examples of solutes yielding anions $M''Cl_6^=$ are: hexachlorostannates ($SnCl_6^=$), hexachlorozirconates ($ZrCl_6^=$) and hexachlorotitanates ($TiCl_6^=$). Solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), perchlorates $ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; an alkaline earth metal, such as magnesium, calcium, strontium, and barium; or a lanthanide rare earth element, such as lanthanum, terbium, neodymium, cerium, europium and samarium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium ($(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation such as phosphorus oxydichloride $(POCl_2^+)$ in the case of a phosphorus oxychloride-based electrolytic solution, $SOCl^+$, and $SO_2Cl^+$, etc.

The solute for a particular cell can be chosen to yield a combination of any of the anions and cations listed above; however, the electrolyte must contain at least $10^{-3}$ moles per liter of cation and at least $10^{-3}$ moles per liter of anion. Preferably, at least $10^{-3}$ moles per liter of cation and at least $10^{-1}$ moles per liter of anion are present.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachlorostannate, lithium hexachlorozirconate, lithium hexachlorotitanate and lithium chlorosulfate. Other preferred compounds are Lewis acids, particularly aluminum chloride $(AlCl_3)$, boron trichloride $(BCl_3)$, boron fluoride $(BF_3)$, tin chloride $(SnCl_4)$, antimony chloride $(SbCl_5)$, antimony fluoride $(SbF_5)$, titanium chloride $(TiCl_4)$, aluminum bromide $(AlBr_3)$, phosphorus fluoride $(PF_5)$, phosphorus chloride $(PCl_5)$, arsenic fluoride $(AsF_5)$, arsenic chloride $(AsCl_5)$, zinc chloride $(ZnCl_2)$ and zirconium chloride $(ZrCl_4)$, in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as the result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

Although not required for the cells of this invention, a suitable separator can be employed to insulate the anode and cathode current collector materials when no electrical current flows through the external circuit. A separator prevents the mechanical and electrical contact between the cathode current collector material and the anode. A wide variety of ceramic and plastic materials having small pore sizes are available. Examples of such materials include alumina, beryllia, titania, porcelain, porous glass, fritted glass, glass mat, nonwoven porous polytetrafluoroethylene and other fluorinated polymers, polypropylene and polyethylene.

The use of the electrolyte in paste-form offers many advantages over the cells of Application Ser. No. 305,813 wherein the carbon is physically a part of the cathode structure. By suspending the small carbon particles in the inorganic solvent, an extremely high catalyst surface area, upon which the inorganic solvent is electrochemically reduced during operation of the cell, is assured. The electrolytic solution is immobilized by the addition of the carbon particles making the cells less likely to leak either during operation or storage. The carbon particles further serve to block the formation of dendrites on, or from, the anode material, thereby reducing the possibility of internal short-circuiting due to formation of such dendrites between the anode and cathode current collector material. Any dendrites formed would tend to discharge first, making rechargeability of the cells more likely. Additionally, no separator is required between the carbon particles and the anode material, although it may still be desirable to use one to electrically insulate the anode from the cathode current collector. Thus, in general, a much simplified mechanical configuration is described by this invention through use of the electrolyte paste having the composition as set forth above. In an even further simplified structure where the metal cell case is used as the inert current collector, no cathode binders, support grids, or pressing or rolling operations are necessary. Such a cathode current collector structure cannot lose mechanical strength and thus fail on discharge or charging operations.

As indicated above, the electrochemical cells of this invention exclude sulfur dioxide and other oxidants as cathode depolarizer materials or as solvent or cosolvent materials. Thus, the present invention describes cells in which the inorganic oxyhalide or thiohalide solvent is electrochemically reduced in the absence of other oxidants, such as sulfur dioxide; thus distinguishing this invention from the cells of Maricle et al., U.S. Pat. Nos. 3,567,515 and 3,578,500, all of which make use of sulfur dioxide as an oxidant material. Further, this invention describes the stability of lithium and the inorganic solvent, such as phosphorus oxychloride, in the absence of the passivating film Marcicle the lithium caused by the sulfur dioxide of Marcle et al., supra. It is now believed that the inorganic solvent passivates the anode material, whereby the need to provide a further material, such as the sulfur dioxide of Maricle et al., supra, to perform such a function is eliminated.

The present invention is also considered distinct from the cells described in French Pat. Nos. 1,000,044; 1,583,804; and 2,079,744. The cells described therein make use of dissolved or in situ generated oxidants as the active cathode material (called the anode or positive electrode in the French patents). Thus, the present invention is distinguished from the teachings of these patents because the solvent material hereof is utilized as the sole oxidant material in the cell, and there are no other oxidants (such as the bromine used in the battery described on pages 3 and 4 of French Pat. No. 2,079,744) present in these cells.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

Energy density data, when given, is based solely with respect to the combined weight of the lithium in the anode structure and the weight of the electrolyte paste.

In the following Examples, the carbon material utilized to form the paste is acetylene black purchased from Shawinigan Products Crop., Englewood Cliffs, N. J. It is formed by the thermal decomposition of acetylene gas and is a very pure form of finely divided carbon, the properties of which approach those of finely divided graphite. It is available in two bulk densities, 50% compressed (6.25 lb./cu. ft.) and 100% compressed (12.5 lb./cu. ft.). The absorption-stiffness values for the 50% compressed material is 33 ml./5 grams and for the 100% compressed material is 18 ml./5 grams. The absorption-stiffness value is a measure of stiffness or retentivity of bulkiness and of absorption of liquid. The amount of liquid required to form 5 grams of the black into a single mass is the value given above. These minimum ratios of liquid to solid have been utilized (or exceeded) in these Examples to give pastes of uniform consistency. In general, it has been found that thinner pastes (i.e., pastes with, to a degree, more solvent material) give better results, for if the paste is too thick, short circuiting through the carbon particles can, or may, result.

In certain of the Examples (e.g., Examples 9 and 13), the cells are "rapped" (i.e., mechanically jarred) with a temporary improvement in cell performance. It is believed that LiCl, an insulator, which is formed, via cell reactions, adjacent the interface between the anode and the electrolyte paste is loosened from the surface of the anode, thereby letting fresh paste contact the anode. Thus, there is a temporary improvement in cell performance. This need for mechanical jarring is at least partially obviated by the use of thinner pastes which provide for better continual contact with the anode.

EXAMPLE I

An electrolyte paste is prepared from 5 gm. of Shawinigan carbon black (50% compressed), 28 ml. of a 2M solution of LiCl + AlCl$_3$ in sulfuryl chloride, and 5 ml. of sulfuryl chloride. A 0.022 inch × 2 inch lithium ribbon is wrapped around a three-fourths inch glass tube to form a hollow cylinder when the glass tube is removed. The lithium cylinder is inserted into the center of a "C" cell nickel can filled with the electrolyte paste prepared above. Clip leads are connected (inside a glove box) to the nickel can (cathode current collector) and the lithium cylinder.

With the cell operating at room temperature, the open circuit potential was noted. A decade resistance box, adjustable from 1 to 10,000 ohms, was then connected across the electrodes and the voltage noted at various resistance levels. The results are given in Table I below.

TABLE I

| Resistance (Ohms) | Voltage (Volts) | Current (ma.) |
|---|---|---|
| Open circuit | 3.820 | — |
| 10,000 | 3.819 | 0.35 |
| 5,000 | 3.816 | 0.70 |
| 1,000 | 3.806 | 3.7 |
| 500 | 3.794 | 7.4 |
| 100 | 3.713 | 36.0 |
| 10 | 3.300 | 274 |

The cell was discharged at 300 mA constant current for about 1 hour. The voltage dropped within 6 minutes to 2.5 volts and fluctuated ± 0.25 volt due to internal shorting between the lithium anode and the nickel can. The lithium anode was lifted slightly to increase the distance between the bottom of the anode and the can, and the voltage increased to 3.2 volts.

EXAMPLE II

A 4 inch × 1¾inch × 0.022 inch lithium ribbon is pressed onto a ½inch × 1¾inch 5Ni7, 1/0 nickel Exmet screen spot welded to a 0.030 inch diameter nickel wire, and this entire anode assembly would into a tight spiral. A 5 mil polytetrafluoroethylene disc insulator is placed on the bottom of a C cell nickel can which is then filled with the electrolyte paste of Example I, the anode inserted into the paste, and a polytetrafluoroethylene cap fitted tightly over the top of the cell. When left on open circuit for 1 hour, the voltage climbed to, and leveled at 3.835 volts. The cell was discharged at 100 mA constant current, the voltage dropping to, and leveling at, 3.57 volts after 3 minutes of discharge. After 14 minutes of discharge, the voltage was 3.53 volts, and after 6½ hours of discharge the voltage was steady at 3.275 volts. After 15½ hours of discharge, cell voltage had decreased to 2.2 volts. Upon slight movement of the anode in the paste to improve contact, cell voltage increased to 3.15 volts. Cell voltage dropped to 2.2 volts after 2½ hours further discharged at constant 100 mA. The cell was opened and 2 mil of sulfuryl chloride was added to the paste. Voltage climbed above 3.3 volts and, after 6 hours further discharge at 100 mA, cell voltage remained steady at 3.2 volts.

EXAMPLE III 2.52 of 50% compressed Shawinigah carbon black is dried overnight at 110°C in a vacuum oven (< 1 mm Hg). The dried material is transferred to a dry box where 25 ml total of 2 M LiAlCl$_4$ in SO$_2$Cl$_2$ is added to the carbon to make a smooth paste. A 3.65 cm length of one-half inch diameter lithium rod is attached to a sheet metal screw in the center of an alumina top. A nickel jar is filled with 23.4 grams of the electrolyte paste prepared above and the lithium anode and alumina top are fitted to the top of the jar. The cell was discharged at 100 mA (6.32 mA/cm$^2$) through a 25 ohm resistor. After 49 hours, cell voltage was 0.97 volts at a current drain of 31 mA. Cell capacity over the 49 hour discharge was 3.43 amp-hours.

EXAMPLE IV

A cell is fabricated having a lithium anode, a graphite rod cathode current collector, and 28.8 g. of an electrolyte paste prepared by mixing 2.0 g. of 50% compressed Shawinigan carbon black with 33 ml of 2 M LiAlCl$_4$ in SO$_2$Cl$_2$ (3.45% carbon). Open circuit potential is 3.86 volts. After 24 hours of discharge at a constant current of 100 mA, the voltage is 2.75 volts. The voltage went below 2 volts after 47.75 hours and went to 0 volts in 48.5 hours. Energy density to 0 volts is 187 watt-hours/lb.

EXAMPLE V

A cell is fabricated having a lithium anode, a graphite rod cathode current collector, and 26.8 g. of an electrolyte paste perpared by mixing 4.0 g. of 50% compressed Shawinigan carbon black with 33 ml of 2 M LiAlCl$_4$ in SO$_2$Cl$_2$ (6⅔%  carbon). Open circuit potential is 3.76 volts which increased (after current density test) to 3.84 volts. When the cell was discharged at 100 mA, voltage decreased from 3.82 volts to 3.63 volts.

The voltage went below 3 volts after 19.25 hours of discharge, and went to 0 volts after 21.5 hours. Energy density to 0 volts is 113 watt-hours/lb.

EXAMPLE VI

A cell is fabricated having a lithium anode, a graphite rod cathode current collector, and 26.81 g. of an electrolyte paste prepared by mixing 5.0 g. of 50% compressed Shawinigan carbon black with 33 ml of LiAlCl$_4$ in SO$_2$Cl$_2$ (8.2% carbon). Open circuit potential is 3.76 volts. When discharged at 100 mA, the voltage decreased immediately from 3.82 volts to 3.65 volts, and went below 3 volts after 13.3 hours. After 14.6 hours, the voltage (2.5 volts) became erratic, and eventually went to 0 volts in 27.8 hours. Energy density to 0 volts is 100 watt-hours/lb.

EXAMPLE VII

Example VI is repeated except the electrolyte paste is prepared with 3.0 g. of carbon black instead of 2.0 g. (giving a paste having 5.1% carbon). Open circuit potential is 3.68 volts. When discharged at 100 mA, the voltage decreased to 3.55 volts, remained steady, went below 3 volts after 39.75 hours, and to 0 volts after 44.5 hours. Energy density to 0 volts is 208 watt-hours/lb.

EXAMPLE VIII

Example VI is repeated except the electrolyte paste is prepared with 2.5 g. of carbon black instead of 2.0 g. (giving a paste having 4.5% carbon). Open circuit potential is 3.88 (or 3.57) volts. When discharged at 100 mA, the voltage decreased to 3.4 volts. After 2 hours, the voltage was 3.3 volts. The voltage went to 2 volts after 38.5 hours and to 0 volts after 40.7 hours. Capacity to 3.0 volts is 0.40 amp-hours, and to 0 volts is 7.11 amp-hours. Energy density to 0 volts is 169 watt-hours/lb.

EXAMPLE IX

An electrolyte paste is prepared from 2.27 g. of 50% compressed Shawinigan carbon black and 25 ml of a 2 M solution of LiAlCl$_4$ in SO$_2$Cl$_2$ (giving a paste having 5.1% carbon). A 0.040 inch thick lithium foil is pounded onto a nickel grid which was then spot welded to the inside of a C cell nickel case. A polytetrafluoroethylene disc insulator is placed on the bottom of the nickel case which is then filled with 23.2 g. of electrolyte paste prepared above. A rosin impregnated carbon rod, which was sintered at 750°C for 1 minute to remove the rosin, is threaded, screwed into an alumina top, and then placed into the center of the paste-filled nickel case. Open circuit potential is 3.81 volts. When discharged at 100 mA (3.4 mA/cm$^2$), the voltage went below 3 volts after 21 hours, and to 0 volts after 30 hours. Upon rapping the cells the voltage went up to 2.8 volts, and then decreased to 0 volts after a further 2.3 hours.

EXAMPLE X

Example IX is repeated except 1.52 g. of carbon black is used instead of 2.27 g. giving a paste having 3.44% carbon, and the case is filled with 21.63 g. of paste. Open circuit potential is 3.83 volts. When discharged at 100 mA (3.40 mA/cm$^2$), the voltage decreased immediately to 3.27 volts, then leveled off at about 3 volts. The voltage went below 2 volts after 31 hours and to 0 volts after 32.25 hours. Cell capacity to 0 volts is 3.23 amp-hours, and energy density to 0 volts is 170 watt-hours/lb.

EXAMPLE XI

Example IX is repeated except 3.79 g. of 100% compressed Shawinigan carbon black (a denser material) is mixed with 25 ml of a 2 M solution of LiAlCl$_4$ in SO$_2$Cl$_2$ giving a paste having 8.19% carbon, and the case is filled with 22.2 g. of paste. Open circuit potential is 3.89 volts. When discharged at 100 mA/cm$^2$ (3.4 mA/cm$^2$), the voltage decreased immediately to 3.21 volts, then leveled off at 3.05 volts. The voltage went below 3 volts after 27.5 hours and to 0 volts after 32.4 hours. Cell capacity to 3.0 volts is 2.77 amp-hours, and to 0.0 volts is 3.24 amp-hours. Energy density to 0 volts is 180 watt-hours/lb.

EXAMPLE XII

Example XI is repeated except 2 g. of 100% compressed carbon black is mixed with 18 ml of a 2 M solution of LiAlCl$_4$ in SO$_2$Cl$_2$, giving a paste having 6.14% carbon, and the case is filled with 21.12 g. of paste. Open circuit potential is 3.91 volts. When discharged at 100 mA, the voltage drops rapidly to just below 3.0 volts where it levels off. Cell capacity to 0 volts is 3.86 amp-hours, and energy density to 0 volts is 203 watt-hours/lb.

EXAMPLE XIII

Example IX is repeated except the paste is prepared with 6 g. of 100% compressed Shawinigan carbon black with 36 ml of a 2 M solution of LiAlCl$_4$ in SO$_2$Cl$_2$ (giving a paste having 9.8% carbon), and the battery case is filled with 22.1 g. of this paste. Open circuit potential is 3.74 volts. When discharged at 100 mA, the voltage dropped to 2.95 volts. After 15.5 hours the voltage was 2.5 volts and started to drop rapidly to 0.9 volts at 18 hours and 0 volts at 20 hours. When the cell was rapped, the voltage increased to 2.41 volts, dropping to 0 volts in an additional 2½ hours. Cell capacity to 0 volts is 2.34 amp-hours, while energy density to 0 volts is 103 watt-hours/lb.

EXAMPLE XIV

Example XIII is repeated except a 0.010 inch thick glass mat mechanical separator is placed between the lithium metal and the electrolyte paste. Open circuit potential is 3.94 volts. When discharged at 100 mA, the voltage decreased to 3.28 volts and then leveled off at 3.1 volts. Cell voltage went below 3 volts after 27.5 hours. After 30.5 hours cell voltage decreased sharply to 0.85 volts, then went to 0 volts at 31.5 hours. After one-half hour at 0 volts, the cell was rapped and the voltage increased to 3.18 volts. After 9 additional hours, the voltage went below 3 volts, then went to 0 volts after 45.5 hours total discharge. Cell capacity to 3 volts was 11.18 watt-hours while total cell capacity was 13.26 watt-hours.

EXAMPLE XV

Example IX is repeated except the electrolyte paste is a freshely prepared mixture of 3 g. of 100% compressed Shawinigan carbon black and 18 ml of 2 M LiAlCl$_4$ in SO$_2$Cl$_2$. The separator is wetted with 2 g. of electrolyte (without carbon) and the carbon rod (cathode current collector) is soaked in the electrolyte (also without carbon) before assembly. 22 G. of the paste is used. Open circuit potential was 3.94 volts. When discharged at 100 mA, cell voltage leveled of at about 3.1 volts where it remained for about 32 hours. Voltage dropped to about 2.5 volts after 34 hours, then dropped rapidly to 0 volts in 1 additional hour. Cell capacity to 3.0 volts was 2.87 amp-hours, to 0 volts was 3.5 amp-hours. Energy density to 3.0 volts is 173 watt-hours/lb., while energy density to 0 volts is 204 watt-hours/lb.

EXAMPLE XVI

Example IX is repeated except the electrolyte paste is prepared from 2.27 g. of 50% compressed Shawinigan carbon black and 25 ml of 2 M $LiAlCl_4$ in $SO_2Cl_2$ also containing 0.1% FC-95 surfactant (a product of 3M Co. of Minneapolis, Minn.). Open circuit potential is 3.88 volts. When discharged at 100 mA (3.47 mA/cm$^2$), cell voltage decreased to 3.41 volts, then leveled off at 3.25 volts. Cell voltage dropped below 3 volts after 38 hours, then to 0 volts in 42 hours. The cell was rapped and the voltage increased to 2.5 volts. Discharge lasted an additional 3 hours. Cell capacity to 3.0 volts was 3.79 amp-hours, to 0 volts was 4.57 amp-hours. Cell capacity to 3 volts is 234 watt-hours/lb., while total energy density is 226 watt-hours/lb.

EXAMPLE XVII

Example XVI is repeated except 2.5 g. of the carbon black are used instead of 2.27 g. of 18 ml of 2 M $LiAlCl_4$ in $SO_2Cl_2$ are used in place of 25 ml. The lithium anode is a double layer 80 mils thick instead of 40 mils thick. The carbon rod (cathode current collector) is soaked in the electrolyte (without carbon) and the separator is wetted with 3 g. of electrolyte, both before final assembly. Open circuit is 3.79 volts. When discharged at 100 mA, cell voltage leveled off at 3 volts for 25 hours, and went gradually to 0 volts after 38 hours. Cell capacity to 3.0 volts was 2.58 amp-hours, and to 0 volts was 3.85 amp-hours. Cell energy capacity to 3.0 volts was 7.83 watt-hours, while total energy capacity was 10.03 watt-hours.

EXAMPLE XVIII

Example IX is repeated except the paste is prepared by mixing 2.27 g. of 50% compressed Shawinigan carbon black with 25 ml of 1.8 M $LiAlCl_4$ in thionyl chloride ($SOCl_2$). Open circuit potential is 3.60 volts. When discharged at 100 mA, cell voltage drops to, and levels off at, about 3.0 volts for about 20 hours, then starts to drop gradually. The cell is rapped and the voltage rises to about 'volts, but after about 1 hour starts to drop rapidly. The cell is rapped over again and the voltage increases to about 3 volts. Ater holding steady for about 5 hours, the voltage drops to 0 volts after about 33 hours total dischage. Cell capacity to 0 volts is 3.32 amp-hours, while total energy capacity is 9.12 watt-hours.

EXAMPLE XIX

A polytetrafluoroethylene insulator is placed in the bottom of a size AA zinc can. A 10 mil thick lithium foil is pressed onto a 3/0 nickel Exmet screen and then spot welded onto the internal surface of the zinc can, with the nickel facing the zinc. A glass mat separator is placed over the lithium foil anode, and the can filled with 6.5 g. of an electrolyte paste prepared by mixing 2.5 g. of carbon with 33 ml of 2 M $LiAlCl_4$ in $SO_2Cl_2$.

1 G. of the electrolyte (without carbon) is used to wet the separator to be placed between the lithium anode and the paste. Open circuit potential is 3.88 volts. When discharged at 45 mA, cell voltage drops to about 3.2 volts, dropping to 2.4 volts in 15.3 additional hours, then sharply dropping to 0 volts after 17.8 hours. Cell capacity to 3.0 volts is 0.69 amp-hours, and to 0 volts is 0.80 amp-hours.

EXAMPLE XX

Example XIX is repeated except a nickel plated stainless steel can, 20 mil foil lithium, and a glass mat separator (between the lithium anode and the paste) are used. 3.5 G. of a paste prepared by mixing 0.91 g. of a 50% compressed carbon black with 10 ml of 2 M $LiAlCl_4$ in $SO_2Cl_2$ is used to fill the cell. Open circuit potential is 3.92 volts. When discharged at 45 mA (about 3 mA/cm$^2$), cell voltage decreases to 2.75 volts. Voltage went below 2 volts after 9.9 hours, and to 0 volts in 12.2 hours. Cell capacity to 0 volts is 0.55 amp-hours, while total energy capacity is 1.31 watt-hours.

EXAMPLE XXI

A C size cell is fabricated having a 70 mil thick lithium anode, a carbon cathode current collector, and 20 g. of a paste prepared by mixing 2.5 g. of carbon black in 33 ml of 2 M of $LiAlCl_4$ in thionyl chloride ($SOCl_2$). A glass mat separator between the lithium anode and the paste is wetted with 3 g. of the electrolyte (without carbon) before assembly. Open circuit potential is 3.64 volts. When discharged at 100 mA, cell voltage decreases to 3.1 volts, and goes below 3 volts after 9.5 hours. After 16 hours, the voltage was 2.87 volts. The discharge rate was increased to 200 mA, and the voltage decreased sharply to 2.61 volts, and 0.5 hours later the voltage is 2.15 volts. The discharge rate was increased to 300 mA, and voltage went to 0 volts in 0.8 hours. Voltage remained at 0 volts for 0.7 hours, then the discharge rate was decreased to 100 mA, and the voltage increased to 1.5 volts and remained steady until the discharge rate was increased to 300 mA when the voltage went again to 0 volts. Cell capacity under this discharge pattern, was 1.94 amp-hours.

EXAMPLE XXII

Sodium foil about 0.04 inch thick is made by pressing sodium metal between mylar sheets in a hydraulic press in a glove box. This foil is trimmed to make a 10 cm$^2$ disc which is pressed onto a nickel current collector in a flat button cell assembly having an alumina top. An electrolyte paste is prepared from 0.6 g. of 50% compressed Shawinigan carbon black and 11 ml. of 1.8 M solution of $NaAlCl_4$ in $SOCl_2$. About 4 cm$^3$ of this plate is used to fill the 10 cm$^2$ × 0.4 cm$^3$ cylindrical recess in the nickel cases, and the cell's halves are put together. Open circuit potential is 3.19 volts. The cell is discharged at 1 mA/cm$^2$ for 51 hours, during which time cell voltage remained around 2.9 – 2.95 volts. Discharge is terminated overnight. Open circuit potential the next morning is 3.25 volts, and discharge is resumed at 1 mA/cm$^2$ for 9 additional hours. Open circuit potential the next morning is 2.75 volts.

EXAMPLE XXIII

A cell is prepared having a lithium anode, a nickel cathode current collector, and an electrolyte paste prepared from 5 g. of 50% compressed Shawinigan carbon black and 40 ml of a saturated solution of LiAlCl₄ in PSCl₃. Open circuit potential is about 3 volts.

EXAMPLE XXIV

A cell is prepared having a lithium anode, a nickel cathode current collector, and an electrolyte paste prepared from 5 g. of 50% compressed Shawinigan carbon black and 35 ml of a 1 M solution of LiBCl₄ in POCl₃.

EXAMPLE XXV

Example XXIV is repeated except the electrolyte paste is prepared from 35 ml of POFCl₂ instead of POCl₃.

While the present invention has been described with reference to specific embodiments thereof, it will be understood by those skilled in this art that various changes may be made without departing from the true spirit and scope of the invention. In addition, many modifications may be made to adapt the particular situation, material, need apparatus, process, or then-present objective to the spirit of the present invention without departing from its essential teachings.

What is claimed is:

1. An electrochemical cell comprising an oxidizable active anode material; a solid, non-consumable, electrically conducting inert cathode current collector; said anode material being more electropositive than said cathode current collector and thus said anode material is oxidized during operation of said cell; and an electrolytic paste between and in contact with said anode and said cathode current collector, said electolytic paste comprising a liquid, electrochemically reducible, covalent inorganic oxyhalide or thiohalide solvent, a solute dissolved in said solvent, and a sufficient quantity of small carbon particles suspended in said solvent to give the electrolyte paste-like consistency; said carbon particles in said electrolyte paste catalyzing the electrochemical reduction of said inorganic solvent, whereby said inorganic solvent in conjunction with said oxidizable anode material serves as a source of electrical energy during operation of said cell.

2. The electrochemical cell of claim 1 wherein said active anode material is lithium.

3. The electrochemical cell of claim 1 wherein said active anode material is sodium.

4. The electrochemical cell of claim 1 wherein said active anode material is selected from the group consisting of the alkali metals, the alkaline earth metals, the Group III A metals, the Group IV A metals, the Group V A metals, the transition metals, the rare earth metals, and semiconductors.

5. The electrochemical cell of claim 1 wherein said inert cathode current collector is selected from the group consisting of the transition metals.

6. The electrochemical cell of claim 1 wherein said inert cathode current collector comprises carbon or graphite.

7. The electrochemical cell of claim 1 wherein said inert cathode current collector comprises the housing or case for said cell.

8. The electrochemical cell of claim 1 wherein said inorganic solvent at least one oxyhalide of phosphorus, sulfur, or selenium, or at least one thiohalide of phosphorus or sulfur.

9. The electrochemical cell of claim 1 wherein said inorganic solvent is selected from the group consisting of phosphorus oxychloride, monofluorophosphoryl dichloride, monobromophosphoryl difluoride, monofluorophosphoryl dibromide, thiophosphoryl chloride, thionyl chloride, thionyl bromide, sulfuryl chloride, monofluorothiophosphoryl dichloride, monofluorothiophosphoryl dibromide, monobromothiophosphoryl difluoride, and mixtures thereof.

10. The electrochemical cell of claim 1 wherein said inorganic solvent is thionyl chloride.

11. The electrochemical cell of claim 1 wherein said inorganic solvent is sulfuryl chloride.

12. The electrochemical cell of claim 1 wherein said inorganic solvent is the sole oxidant material in said cell.

13. The electrochemical cell of claim 1 wherein said solute provides at least one anion having the formula $X^-$, $MX_4^-$, $M'X_6^-$, and $M''X_6^-$, where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one cation selected from the group consisting of alkali metals, the alkaline earth metals, the lanthanides, $POCl_2^+$, $SOCl^+$, $SO_2Cl^+$, and $R_4N^+$, where R is a radical selected from the group consisting of methyl, ethyl, propyl, isopropyl, butyl and isobutyl.

14. The electrochemical cell of claim 1 wherein said solute includes at least one compound selected from the group consisting of lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate.

15. The electrochemical cell of claim 1 wherein said solute comprises a Lewis acid.

16. The electrochemical cell of claim 1 wherein said carbon particles comprise carbon black particles.

17. The electrochemical cell of claim 1 wherein said carbon particles comprise graphite particles.

18. The electrochemical cell of claim 1 wherein said electrolyte paste contains from up to about 20%, by weight, of said carbon particles.

19. The electerochemical cell of claim 1 further including an insulator between said anode material and said inert cathode current collector.

20. The electrochemical cell of claim 1 wherein one of the products of the discharge of said cell is the halide of said active material, the halogen in said halide originating from said inorganic solvent.

21. The electrochemical cell comprising an alkali metal active anode material; a solid, non-consumable, electrically conducting, inert cathode current collector; said anode material being more electropositive than said cathode current collector, and thus said anode material is oxidized during operation of said cell; and an electrolytic paste between and in contact with said anode material and said cathode current collector, said electrolytic paste comprising a liquid, electrochemically reducible, covalent inorganic oxyhalide solvent selected from the group consisting of thionyl chloride and sulfuryl chloride, a solute dissolved in said solvent, and a sufficient quantity of small carbon particles suspended in said solvent to give the electrolyte paste-like consistency; said carbon particles in said electrolyte paste catalyzing the electrochemical reduction of said inorganic oxyhalide solvent, whereby said inorganic oxyhalide solvent in conjunction with said alkali metal anode serves as a source of electrical energy during operation of said cell.

22. The electrochemical cell of claim 21 wherein said inorganic oxyhalide is the sole oxidant material in said cell.

23. The electrochemical cell of claim 21 wherein said alkali metal active anode material is lithium, and said carbon particles are carbon black particles.

24. The electrochemical cell of claim 23 wherein said inert cathode current collector is carbon.

25. The electrochemical cell of claim 23 wherein said inert cathode current collector is a transition metal.

26. The electrochemical cell of claim 21 wherein one of the products of the discharge of said cell is the halide of said active anode material, the halogen in said halide originating from said inorganic solvent.

* * * * *

UNITED STATES PATENT OFFICE
CERTIFICATE OF CORRECTION

Patent No. 3,891,457          Dated June 24, 1975

Inventor(s)     JAMES J. AUBORN

It is certified that error appears in the above-identified patent and that said Letters Patent are hereby corrected as shown below:

Column 1, after the title, insert the following sentence:
--The Invention herein described was made in the course of or under a contract or subcontract thereunder with the Government.-

Column 1, line 26, "expensive" should be --inexpensive--.

Column 4, line 41, delete "$(alCl_4^-)$" and insert --$(AlCl_4^-)$--.
Column 5, line 13, change "$10^{-3}$" to --$10^{-1}$--;
Column 6, line 38, delete "Maricle" and insert --on--.
Column 6, line 39, delete "Marcle" and insert --Maricle--.

Column 8, line 25, change "discharged" to --discharge--;

Column 11, line 51, delete " 'volts" and insert --3 volts--.

Column 12, line 56, change "cases" to --case--;

Column 13, line 20, insert a comma after "need";
Column 14, line 16, delete "$M''X_6^-$" and insert --$M''X_6^=$--.
Column 8, line 32, delete "Shawinigah" and insert --Shawinigan--.
Column 11, line 29, after "g." change "of" to --and--;

Signed and Sealed this fourth Day of May 1976

[SEAL]

Attest:

RUTH C. MASON
Attesting Officer

C. MARSHALL DANN
Commissioner of Patents and Trademarks